US008762663B2

(12) United States Patent
Broido et al.

(10) Patent No.: US 8,762,663 B2
(45) Date of Patent: *Jun. 24, 2014

(54) TRANSPARENT INPUT / OUTPUT SWITCHING BETWEEN SYNCHRONOUSLY MIRRORED STORAGE VOLUMES

(75) Inventors: Yakov Broido, Hod Hasharon (IL); Daniel I. Goodman, Beit Shemesh (IL); Haim Helman, Saratoga, CA (US); Leonid Kull, Yehud (IL); Orit Nissan-Messing, Hod HaSharon (IL); Guy Rozendorn, Ramat Gan (IL)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/533,087

(22) Filed: Jun. 26, 2012

(65) Prior Publication Data

US 2012/0278280 A1  Nov. 1, 2012

Related U.S. Application Data

(63) Continuation of application No. 13/095,646, filed on Apr. 27, 2011.

(51) Int. Cl.
  *G06F 12/16* (2006.01)
  *G06F 3/06* (2006.01)

(52) U.S. Cl.
  CPC ............ *G06F 3/0635* (2013.01); *G06F 3/0607* (2013.01); *G06F 3/067* (2013.01); *G06F 3/0647* (2013.01)
  USPC ......................................................... 711/161

(58) Field of Classification Search
  CPC ... G06F 3/0607; G06F 3/0617; G06F 3/0634; G06F 3/0635; G06F 3/0647; G06F 3/0649; G06F 3/067
  See application file for complete search history.

(56) References Cited

U.S. PATENT DOCUMENTS

| | | | |
|---|---|---|---|
| 6,304,980 | B1 | 10/2001 | Beardsley et al. |
| 7,340,572 | B2 | 3/2008 | Cochran |
| 7,484,050 | B2 | 1/2009 | Guha et al. |
| 7,689,799 | B2 | 3/2010 | Black |
| 7,707,186 | B2 | 4/2010 | LeCrone et al. |
| 7,721,044 | B1 * | 5/2010 | Chatterjee et al. ............ 711/114 |
| 7,730,274 | B1 | 6/2010 | Usgaonkar |
| 7,793,060 | B2 | 9/2010 | Zohar et al. |
| 7,805,566 | B2 | 9/2010 | Abouelwafa et al. |

(Continued)

OTHER PUBLICATIONS

Weber, Ralph O., Working Draft T10/1731-D, "Information Technology—SCSI Primary Commands—4 (SPC-4)", Revision 16, Jul. 29th, 2008, pp. XIV, 105-112, and 358-360.*

*Primary Examiner* — April Y Blair
*Assistant Examiner* — Michael C Kolb
(74) *Attorney, Agent, or Firm* — Griffiths & Seaton PLLC (57) ABSTRACT

A method for configuring transparent synchronous mirroring volume switching for a first volume and a second volume that are coupled, via a storage area network, to a host computer, with the first volume mapped to the host computer, by. The method includes initiating synchronization of status data between the first volume and the second volume, and setting the first volume to an active state. The second volume is set to an inactive state, and an identifier associated with the active first volume is copied to a memory coupled to the inactive second volume. The copied identifier is retrieved from the memory by the host computer, and the inactive second volume is then mapped to the host computer.

10 Claims, 3 Drawing Sheets

(56) References Cited

U.S. PATENT DOCUMENTS

| | | |
|---|---|---|
| 7,818,522 B2 | 10/2010 | Bartfai et al. |
| 8,495,325 B2 * | 7/2013 | Yamamoto et al. ............ 711/165 |
| 2004/0260873 A1 * | 12/2004 | Watanabe ...................... 711/114 |
| 2005/0204104 A1 * | 9/2005 | Aoshima et al. .............. 711/161 |
| 2005/0229021 A1 * | 10/2005 | Lubbers et al. ................... 714/2 |
| 2006/0015697 A1 * | 1/2006 | Morishita et al. ............. 711/162 |
| 2007/0055797 A1 * | 3/2007 | Shimozono .................... 710/36 |
| 2007/0067593 A1 * | 3/2007 | Satoyama et al. ............ 711/165 |
| 2007/0198790 A1 * | 8/2007 | Asano et al. .................. 711/162 |
| 2007/0233980 A1 | 10/2007 | Cox et al. |
| 2007/0271430 A1 * | 11/2007 | Maki et al. ..................... 711/162 |
| 2008/0140966 A1 * | 6/2008 | Deguchi et al. ............... 711/162 |
| 2009/0031320 A1 * | 1/2009 | Nakagawa et al. ............. 718/104 |
| 2009/0125679 A1 * | 5/2009 | Takeuchi ....................... 711/114 |
| 2011/0202737 A1 * | 8/2011 | Takahashi et al. ............ 711/162 |
| 2012/0124309 A1 * | 5/2012 | Watanabe et al. ............ 711/162 |
| 2013/0024639 A1 * | 1/2013 | Yamamoto et al. ........... 711/165 |

* cited by examiner

FIG. 3

TRANSPARENT INPUT / OUTPUT SWITCHING BETWEEN SYNCHRONOUSLY MIRRORED STORAGE VOLUMES

CROSS-REFERENCE TO RELATED APPLICATIONS

This application is a Continuation of U.S. patent application Ser. No. 13/095,646, filed on Apr. 27, 2011, which is related to U.S. patent application Ser. No. 13/095,642 titled "Online Volume Migration Using Multi-Path Input/Output Masquerading," filed on Apr. 27, 2011, and which is incorporated herein by reference.

FIELD OF THE INVENTION

The present invention relates generally to data storage, and specifically to enabling a host computer to seamlessly swap roles of synchronously mirrored primary and secondary storage volumes.

BACKGROUND OF THE INVENTION

Mirroring is a technique used to replicate a primary storage volume to a separate secondary storage volume, in order to ensure redundancy. For a storage facility comprising primary and secondary storage volumes, mirroring can be implemented either synchronously or asynchronously. During synchronous mirroring, a host (e.g., a database server) communicating with the storage facility receives a write acknowledgement after data is successfully written to both the primary and the secondary storage volumes. Synchronous mirroring is typically implemented over a storage area network (SAN).

During asynchronous mirroring, the host receives the write acknowledgement after the data is written to the primary volume (i.e., the secondary volume may have not yet received the data and/or may not have acknowledged writing the data). Asynchronous mirroring is typically implemented over lower speed wide area networks, especially over greater distances.

SUMMARY OF THE INVENTION

There is provided, in accordance with an embodiment of the present invention a method, including configuring transparent synchronous mirroring volume switching for a first volume and a second volume that are coupled, via a storage area network, to a host computer, with the first volume mapped to the host computer, by initiating synchronization of status data between the first volume and the second volume, setting the first volume to an active state and the second volume to an inactive state, copying an identifier associated with the active first volume to a memory coupled to the inactive second volume, retrieving, by the host computer, the copied identifier from the memory, and after the retrieving, mapping the inactive second volume to the host computer.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Typically, volumes stored on disk drives, are coupled to a host computer via logical paths between each of the volumes and the host computer. Each of volumes may have an associated unique volume identifier, such as a serial number. The unique volume identifier can be used to join logical paths associated with each of the volumes. As there are multiple paths associated with the volumes, the volumes comprise multipath devices. Communicating with the multipath devices is referred to as multipath input/output (I/O). Multi-path devices are also referred to as MPIO devices.

In embodiments of the present invention, in addition to having an associated volume identifier, each volume has an associated state, which can be either active or inactive. Additionally, a state of each logical path to a particular volume can be associated with the state of the volume. For example, if the state of a particular volume is active, then the state of all logical paths between the host computer and the particular volume are active. Likewise, if the state of the particular volume is inactive, then state of all logical paths between the host computer and the particular volume are inactive.

While configuring synchronous mirroring from a first (i.e., a primary) volume to a second (i.e., a secondary) volume, embodiments of the present invention provide methods and systems for manipulating the volume identifiers and the states of the primary and the secondary volumes, thereby enabling the host computer to seamlessly transition from the first volume to the second volume. Typically the host computer transitions from the first volume to the second volume due to a failure in the first volume or a failure in the path between the first volume and the second volume.

In some embodiments, the volume identifier associated the first volume is copied to the second volume, and the state of the second volume's paths is set to inactive. After copying the first volume's volume identifier to the second volume, both of the volumes are associated with the same volume identifier, and the second volume "masquerades" as the first volume (according to conventions used by the host to uniquely identify volumes and map logical paths to a single multipath device). Copying volume identifiers is described in more detail in U.S. patent application Ser. No. 13/095,642 "Online Volume Migration Using Multi-Path Input/Output Masquerading" referenced above.

Upon mapping the masquerading second volume to the host computer, the host computer detects a single volume with logical paths that are active (i.e., the logical paths between the host computer and the first volume), and new logical paths that are inactive (i.e., the new logical paths between the host computer and the second volume). After swapping the states of the source and the second volumes, all the new logical paths to the second volume are active, and all logical paths to the first volume are inactive. Therefore, after swapping the states of the source and the second volumes, all input/output operations are redirected to the second volume instead of the first volume.

Upon completing the steps described supra, the host computer still "thinks" it has active logical paths to the first volume, when in fact the active logical paths are now to the second volume.

System Description

Figure 1:
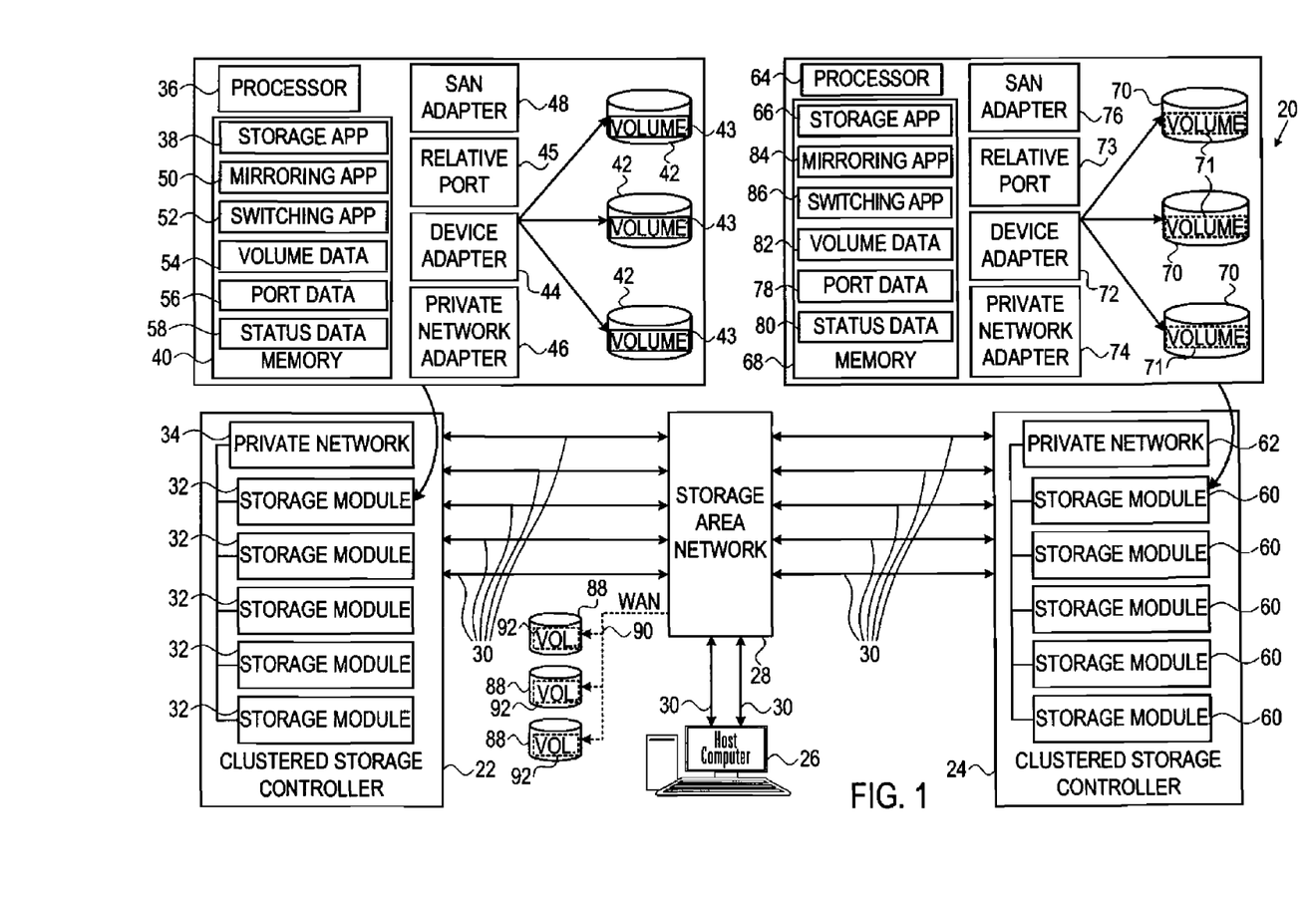
FIG. 1 is a schematic pictorial illustration of synchronously mirrored storage controllers configured to perform high availability volume switching, in accordance with an embodiment of the present invention.

FIG. 1 is a schematic pictorial illustration of a storage facility 20 configured to implement transparent synchronous mirrored volume switching, in accordance with an embodiment of the present invention. Storage facility 20 comprises a first storage controller 22, a second storage controller 24, and a host computer 26, which are all coupled to a storage area network (SAN) 28 via input/output (I/O) paths 30. In the configuration shown in FIG. 1, storage controllers 22 and 24 are synchronously mirrored via SAN 28, and storage controllers 22 and 24 are asynchronously mirrored to a tertiary volume 92, via a wide area network (WAN) 90. Typically, tertiary storage volume 92 is stored in a third storage controller (not shown).

First storage controller 22 comprises multiple first storage modules 32 coupled via a private network 34. Each first storage module 32 comprises a processor 36 configured to execute a storage module application 38 from a memory 40. Storage module application 38 manages a number of first storage devices 42 (e.g., disk drives) that store a first volume 43. In the configuration shown in FIG. 1, first volume 43 is distributed among first storage devices 42, and comprises a single logical storage area in storage facility 20.

The source storage devices are coupled to first storage modules 32 via a device adapter 44. The first storage modules are coupled to private network 34 via a private network adapter 46, and to SAN 28 via a SAN adapter 48.

In addition to storage module application 38, processor 36 executes a mirroring application 50, and a transparent synchronous mirroring volume switching application 52 (also referred to herein as switching application 52) from memory 40. Mirroring application 50 and switching application 52 are discussed in further detail hereinbelow.

Memory 40 also stores volume data 54 that stores identification data for first volume 43, port data 56 (described in further detail hereinbelow), and status data 58 for first volume 43. Status data 58 may comprise a persistent reservation table that stores information on the sharing status of first volume 43. For example, first volume 43 may be locked (i.e., reserved) for reading and/or writing by host computer 26, or any other host computer (not shown) coupled to SAN 28. Additionally or alternatively, status data 58 may comprise thin provisioning data. Thin provisioning is a mechanism that allows first storage controller 22 to allocate first volume 43 to host computer 26 on a just-in-time basis. The thin provisioning data can include volume allocation data for the source storage controller.

Second storage controller 24 comprises multiple second storage modules 60 coupled via a private network 62. Each second storage module 60 comprises a processor 64 configured to execute a storage module application 66 from a memory 68. Storage module application 66 manages a number of second storage devices 70 that store a second volume 71. In the configuration shown in FIG. 1, second volume 71 is distributed among second storage devices 70, and comprises a single logical storage area in storage facility 20.

The second storage devices are coupled to second storage module 60 via a device adapter 72. The second storage modules are coupled to private network 62 via a private network adapter 74, and to SAN 28 via a SAN adapter 76.

Storage facility 20 can be configured to synchronously mirror first volume 43 to second volume 71 (i.e., first volume 43 is the primary volume and second volume 71 is the secondary volume), or vice versa. When first volume 43 is configured as the primary volume, mirroring application 50 synchronously mirrors first volume 43 to second volume 71, and switching application 52 initiates synchronization of status data 58 and status data 80. Memory 68 also stores port data 78 (described in further detail hereinbelow) and volume data 82. Volume data 82 stores identification data for second volume 71.

When second volume 71 is configured as the primary volume, processor 64 executes a mirroring application 84 to synchronously mirror second volume 71 to first volume 43, and a switching application 86 to initiate synchronization of status data 80 and status data 58.

In the configuration shown in FIG. 1, storage facility 20 asynchronously mirrors, via wide area network (WAN) 90, first and second volumes 43 and 71 to a tertiary volume 92 that is stored on storage devices 88. Typically, if second volume 71 is configured as the secondary volume, mirroring application 84 asynchronously mirrors second volume 71 to tertiary volume 92. Likewise, if first volume 43 is configured as the secondary volume, mirroring application 50 asynchronously mirrors first volume 43 to tertiary volume 92.

Examples of SAN adapters 48 and 76 include switched fabric adapters such as Fibre Channel (FC) adapters, Internet Small Computer System Interface (iSCSI) adapters, Fibre Channel over Ethernet (FCoE) adapters and Infiniband™ adapters. Examples of device adapters 44 and 72 include International Business Machines (IBM) ServeRAID™ M5000 series adapters, which implement both Serial Advance Technology Attachment (SATA) and Serial Attached SCSI (SAS) computer bus interfaces. First and second volumes 43 and 71 typically comprise a combination of high capacity hard disk drives and solid state disk drives.

Processors 36 and 64 typically comprise general-purpose computers, which are programmed in software to carry out the functions described herein. The software may be downloaded to memories 40 and 68 in electronic form, over a network, for example, or it may be provided on non-transitory tangible media, such as optical, magnetic or electronic memory media. Alternatively, some or all of the functions of processors 36 and 64 may be carried out by dedicated or programmable digital hardware components, or using a combination of hardware and software elements.

First volume 43 is coupled to host computer 26 via a relative port 45 in the source storage controller, and second volume 71 is coupled to the host computer via a relative port 73 in the target storage controller. A relative port represents a logical path that the host computer can use to communicate with first and second volumes 43 and 71. While the configuration in FIG. 1 shows each the storage controllers including a single relative port (i.e., relative ports 45 and 73), each of the storage controllers typically comprise multiple relative ports.

Each of the logical paths in storage controllers 22 and 24 typically has a unique relative port identifier. The relative port identifier can refer to a physical slot (not shown) in a specific storage module. For example, if there are five source storage modules (i.e., 0-4) in first storage controller 22, and each first storage module 32 comprises 8 slots (i.e., 0-7), then relative port identifier "0205" can indicate that device adapter 44 is positioned in the sixth ("05") slot of the third ("02") source storage module.

Asynchronous Logical Unit Access (ALUA), also known as Target Port Group Support (TPGS) is a Small Computer System Interface (SCSI) protocol that enables storage controllers 22 and 24 to set the state of each of their respective relative ports. SCSI Primary Commands (SPC) supporting ALUA/TPGS are specified in section 5.8 of SPC-3 and sections 5.8 and 5.11 of SPC-4, from the T10 committee of the InterNational Committee on Information Technology Standards (INCITS), whose disclosure is incorporated herein by reference.

Using ALUA, host computer 26 can also query storage facility 20 and receive the states of each of the logical paths to the storage controllers. For example, since first volume 43 is coupled to host computer 26 via relative port 45, setting the state of relative port 45 sets the state of each logical path between the first volume and host computer 26 coupled via relative port 45.

ALUA states include (1) Active Optimized, (2) Active Non-Optimized, (3) Standby, (4) Unavailable, (5) Transitioning, and (6) Offline. In embodiments of the present invention described herein, the ALUA states are combined as follows:

Active: Active Optimized and Active Non-Optimized.

Inactive: Standby, Unavailable, Transitioning and Offline.

Additionally, the relative ports can be divided into groups (also referred to herein as target port groups), enabling storage facility 20 to set the state of the relative ports and the logical paths at the group level. For example, the relative ports in first storage controller 22 (including relative port 45) can be assigned to Group 0 (via the Report Target Port Groups SCSI command), and the relative ports in second storage controller 24 (including relative port 73) can be assigned to Group 1 (also via the Report Target Port Groups SCSI command). Storage facility 20 can then set the state of the logical paths between the host computer and first storage controller 22 by setting the state of Group 0. Likewise, storage facility 20 can set the state of the logical paths between the host computer and the second storage controller 24 by setting the state of Group 1.

Furthermore, dividing the relative ports into groups helps define a unique relative port identifier, since (as in the example presented above), device adapter 44 may be installed in the sixth slot of the third first storage module 32 of first storage controller 22, and device adapter 72 may be installed in the sixth slot of the third second storage module 60 of second storage controller 24. Therefore, the group identifier and the relative port identifier can be joined to make a combined identifier (i.e., a tuple comprising the group identifier and the relative port identifier), to uniquely identify each of the relative ports in storage facility 20.

There may be instances where host computer 26 executes an operating system that identifies each of the logical paths by a relative port identifier only. In these instances, during an initialization phase of the embodiments described herein, processors 36 and 64 coordinate with each other to assign unique relative port identifiers to each of the relative ports in storage facility 20. The unique relative port identifiers can be used to represent each of the relative ports and their respective logical paths.

During the initialization phase, in addition to identifying the relative ports, processors 36 and 64 typically assign a unique volume identifier, e.g., a serial number to each of volumes 43 and 71. Processor 36 stores the unique volume identifiers for first volume 43 to volume data 54 in memory 40, which is coupled to the first volume. Processor 64 stores the unique volume identifiers for second volume 71 to volume data 82 in memory 68, which is coupled to the second volume.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Transparent Volume Switching

Figure 2:
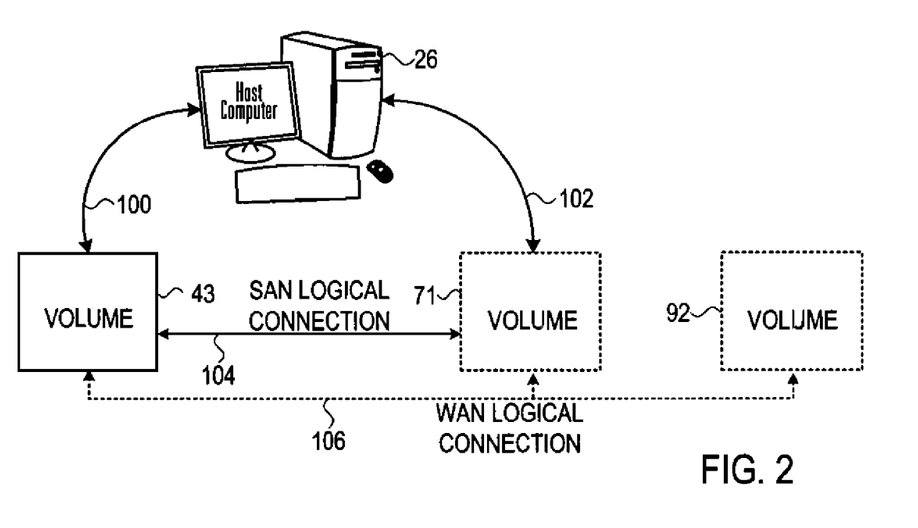
FIG. 2 is a schematic pictorial illustration of logical paths between a primary volume, a secondary volume, a tertiary volume, and a host computer, in accordance with an embodiment of the present invention.

FIG. 2 is a schematic pictorial illustration, showing logical paths between host computer 26, first volume 43 (also referred to herein as the first volume), second volume 71 (also referred to herein as the second volume), and tertiary volume 92. A logical path between two devices indicates how the coupling of the two devices appears to the network. For example, the configuration shown in FIG. 2 shows first volume 43, second volume 71, and host computer 26 arranged in a ring network topology. The actual physical connections between the devices (e.g., via I/O paths 30) will typically differ from the logical paths.

In the configuration shown in FIG. 2, host computer 26 is coupled to first volume 43 via a logical path 100, and the host computer is coupled to second volume 71 via a logical path 102. First and second volumes 43 and 71 are coupled via a logical path 104, which is a communication path that can be used to synchronously mirror data between first and second volumes 43 and 71. Storage facility 20 is also configured to asynchronously mirror either first volume 43 or second volume 71 to tertiary volume 92 via a communication path 106.

When implementing SAN topologies such as Fibre Channel, each of logical paths 100 and 102 typically comprises multiple physical connections, as indicated by I/O paths 30 in FIG. 1. Using multiple physical paths, also called multipath I/O, can provide fault tolerance, since storage facility 20 can route network traffic through an alternative physical path upon a failure in one of the physical paths. Additionally, multipath I/O can enhance performance, since data to be transferred can be spread out over multiple physical paths.

During synchronous mirroring, the storage controller containing the primary volume is referred to herein as the primary storage controller and the storage controller containing the secondary volume is referred to herein as the secondary storage controller. For example, if first volume 43 is the primary volume, then first storage controller 22 is the primary storage controller and is configured to synchronously mirror first volume 43 to the secondary storage controller, in this case second storage controller 24.

Embodiments of the present invention set the states of the relative ports in storage controllers 22 and 24 depending on their roles during synchronous mirroring. The relative ports in the primary storage controller are set to the active state, and the relative ports in the secondary storage controller are set to the inactive state. If the storage controllers swap synchronous mirroring roles, embodiments of the present invention swap the states of the storage controllers' relative ports as well.

Figure 3:
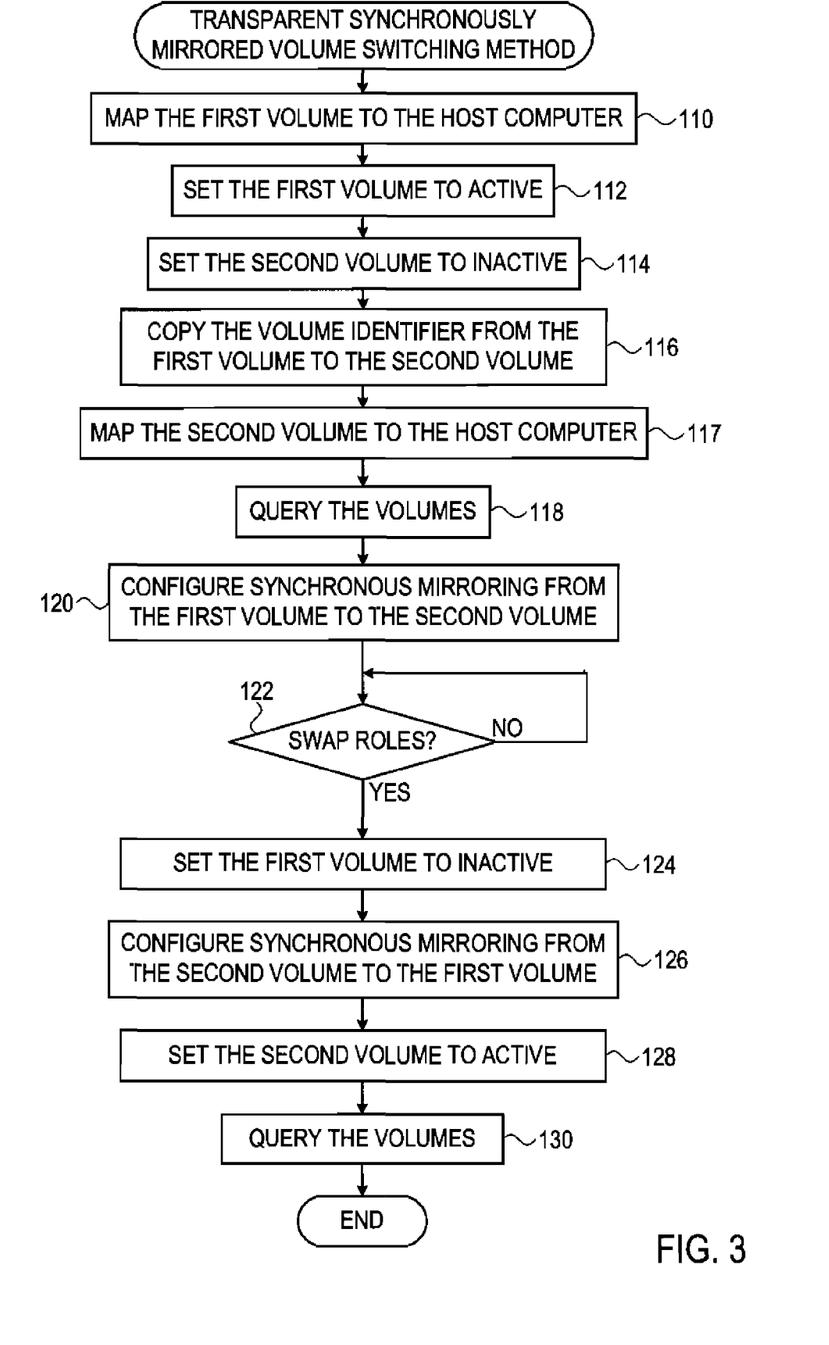
FIG. 3 is a flow diagram that schematically illustrates a transparent synchronously mirrored volume switching method, in accordance with an embodiment of the present invention.

FIG. 3 is a flow diagram that schematically illustrates a method of transparent synchronously mirrored volume switching, in accordance with an embodiment of the present invention. In an initial step 110, switching application 52 maps (i.e., logically connects) the first volume to host computer 26.

In a first state set 112, switching application 52 sets the state of the first volume to the active state. To set the first volume to the active state, switching application 52 can set the target port group associated with the first volume (i.e., the target port group that includes relative port 45) to the active state, thereby setting the physical paths associated with logical path 100 to the active state.

In some embodiments, switching application 52 sets the state of the first volume (and thereby the states of the logical paths between host computer 26 and the first volume) by setting the state of the target port group associated with the relative ports in first storage controller 22. For example, if Group 0 comprises the relative ports in first storage controller 22 (including relative port 45) and Group 1 comprises the relative ports in second storage controller 24 (including relative port 73), then switching application 52 sets Group 0 to the active state, thereby setting the first volume to the active state as well.

In an alternative embodiment, the state of each group remains constant, but the relative ports included in the target port groups change as needed. For example, if Group 0 is in the active state and Group 1 is in the inactive state, switching application 52 can allocate the ports of first storage controller 22 (including relative port 45) to Group 0, thereby setting the first volume to the active state. Alternatively, switching application 52 can allocate the relative ports of first storage controller 22 (including relative port 45) to Group 1, thereby setting the first volume to the inactive state.

In a second state set 114, switching application 86 sets the second volume to the inactive state. To set the second volume to the inactive state, switching application 86 sets the relative port group associated with the second volume (i.e., the target port group that includes relative port 73) to the inactive state, thereby setting the logical paths associated with logical path 102 to the inactive state.

In a copy step 116, switching application 52 copies the volume identifier from the active first volume to the inactive second volume. To copy the volume identifier, switching application 52 copies volume data 54 to volume data 82. Host computer 26 then retrieves the copied volume identifier from volume data 82, thereby joining logical paths between the host computer and the first volume with logical paths between the host computer and the second volume.

In a mapping step 117, switching application 86 maps the inactive second volume to host computer 26. Switching application 52 then conveys a request to host computer 26 to query the volumes in storage facility 20, and in a first query step 118, the host computer queries the volumes in storage facility 20, thereby identifying and determining the states of the volumes mapped to the host computer.

To query storage facility 20, host computer 26 calls a SAN function call that returns all the logical paths to the storage controllers in storage facility 20. For each returned logical path, host computer 26 executes the SCSI Report LUNS command, which returns a logical unit number (LUN) for each device on the returned logical path. Host computer 26 then executes the SCSI Inquiry command for each returned LUN and path, first querying Enable Vital Product Data (EVPD) page 80 (hexadecimal) to retrieve the volume identifier, and then querying EVPD page 83 (hexadecimal) to retrieve the group and the relative port identifiers associated with each LUN. Finally, for each of retrieved group identifiers, host computer executes the Report Target Port Groups command to retrieve the state of each of the groups (i.e., the target port group).

Based on the information retrieved by querying storage facility 20, host computer 26 can define multipath devices and ascertain the state of every logical path to each multipath device. Since there may be multiple logical paths between host computer 26 and each of the volumes, the host computer may detect multiple instances of the same volume (identified by the associated volume identifier), where each instance is via a different logical path.

In a first mirror configuration step 120, mirroring application 50 configures the first volume as the primary volume, and configures the second volume as the secondary volume. As described supra, mirroring replicates data from the primary volume to the secondary volume, in order to ensure redundancy. Therefore, subsequent to step 120, storage facility 20 is configured to synchronously mirror from the first volume to the second volume. Additionally, mirroring application 50 initiates synchronization of status data 58 (for the first volume) and status data 80 (for the second volume). In the configuration shown in FIG. 1, mirroring application 84 may also asynchronously mirror the second volume to tertiary volume 92.

There may be instances where a system administrator (not shown) conveys a request (via host computer 26) for storage controllers 22 and 24 to swap mirroring roles (i.e., configuring the second volume as the primary volume, and the first volume as the secondary volume). Alternatively, if there is a failure in the first volume, a failure in any component in first storage controller 22, or a failure in logical path 100, then storage facility 20 can configure second storage controller 24 as the primary storage controller.

The method stays at a comparison step 122 until there is a need to swap the synchronous mirroring roles of first and second storage controllers 22 and 24. If mirroring applications 50 and 84 receive an instruction to switch the synchronous mirroring roles of their respective storage controllers, then in a third state set 124, switching application 52 sets the state of the active first volume to the inactive state. To set the first volume to the inactive state, switching application 52 can set the target port group associated with the first volume (i.e., the target port group that includes relative port 45) to the inactive state, thereby setting the logical paths associated with logical path 100 to the inactive state.

In a second mirroring configuration step 126, mirroring application 50 configures the inactive first volume as the secondary volume and the inactive second volume as the primary volume (i.e., to synchronously mirror from the second volume to the first volume). Therefore, subsequent to step 126, storage facility 20 is configured to synchronously mirror from the second volume to the first volume.

In a fourth state set 128, switching application 86 sets the state of the second volume to the active state, and conveys a request to host computer 26 to query the volumes of storage facility 20. To set the second volume to the active state, switching application 86 can set the target port group associated with the second volume (i.e., the target port group that includes relative port 73) to the active state, thereby setting the logical paths associated with logical path 102 to the active state. Finally, in a second query step 130, host computer 26 queries the volumes in storage facility 20 to identify and determine the states of the volumes in storage facility 20, and the states of their respective physical paths to the host computer.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:

1. A method, comprising:
configuring transparent synchronous mirroring volume switching for a first volume and a second volume that are coupled, via a storage area network, to a host computer, with the first volume mapped to the host computer, by:
initiating synchronization of status data between the first volume and the second volume;
setting the first volume to an active state and the second volume to an inactive state, by setting a state of a first target port group comprising a port associated with the first volume to the active state, thereby setting a state of all logical paths between the host computer and the first volume to the active state, and setting a state of a second target port group comprising a port associated with the second volume to the inactive state, thereby setting a state of all logical paths between the host computer and the second volume to the inactive state;
after setting the first volume to the active state and the second volume to the inactive state and after the setting the state of the second target port group, copying the active first volume to the inactive second volume, the active first volume including a unique identifier identifying the active first volume, the unique identifier identifying the active first volume being copied to the inactive second volume;
after copying the active first volume to the inactive second volume, retrieving, by the host computer, the unique identifier identifying the first volume from the inactive second volume; and
after retrieving the unique identifier, mapping the inactive second volume to the host computer.

2. The method according to claim 1, further comprising synchronously mirroring the active first volume to the inactive second volume.

3. The method according to claim 1, wherein retrieving the copied identifier joins the paths between the host computer and the first volume with the paths between the host computer and the second volume, thereby identifying the first volume and the second volume as a single multipath device.

4. The method according to claim 1, further comprising, subsequent to configuring transparent synchronous mirroring volume switching from the first volume to the second volume:
  setting the state of the active first volume to the inactive state; and
  setting the state of the inactive second volume to the active state.

5. The method according to claim 4, further comprising synchronously mirroring the active second volume to the inactive first volume.

6. The method according to claim 4, wherein setting the state of the active first volume to the inactive state comprises setting a state of a target port group associated with the first volume to the inactive state, thereby setting a state of all logical paths between the host computer and the first volume to the inactive state.

7. The method according to claim 6, wherein setting the state of the inactive second volume to the active state comprises setting a state of a target port group associated with the second volume to the active state, thereby setting a state of all logical paths between the host computer and the second volume to the active state.

8. The method according to claim 1, wherein the status data is selected from a group consisting of a persistent reservation table and thin provisioning allocation data.

9. The method according to claim 1, wherein setting the state of the inactive first volume to the active state comprises setting a state of a target port group associated with the first volume to the active state, thereby setting a state of all logical paths between the host computer and the first volume to the active state.

10. The method according to claim 1, wherein setting the state of the active second volume to the inactive state comprises setting a state of a target port group associated with the second volume to the inactive state, thereby setting a state of all logical paths between the host computer and the second volume to the inactive state.

* * * * *